US010091838B2

(12) United States Patent
Neubacher

(10) Patent No.: US 10,091,838 B2
(45) Date of Patent: Oct. 2, 2018

(54) METHOD FOR IMPROVED COMMUNICATION BETWEEN NETWORK NODES OF A MOBILE COMMUNICATION NETWORK, MOBILE COMMUNICATION NETWORK, PROGRAM AND COMPUTER PROGRAM PRODUCT

(71) Applicant: Deutsche Telekom AG, Bonn (DE)

(72) Inventor: Andreas Neubacher, Korneuburg (AT)

(73) Assignee: DEUTSCHE TELEKOM AG, Bonn (DE)

( * ) Notice: Subject to any disclaimer, the term of this patent is extended or adjusted under 35 U.S.C. 154(b) by 0 days.

(21) Appl. No.: 15/525,589

(22) PCT Filed: Oct. 29, 2015

(86) PCT No.: PCT/EP2015/075051
§ 371 (c)(1),
(2) Date: May 10, 2017

(87) PCT Pub. No.: WO2016/074931
PCT Pub. Date: May 19, 2016

(65) Prior Publication Data
US 2017/0332441 A1 Nov. 16, 2017

(30) Foreign Application Priority Data
Nov. 11, 2014 (EP) .................................. 14192695

(51) Int. Cl.
*H04W 92/20* (2009.01)
*H04L 12/24* (2006.01)
(Continued)

(52) U.S. Cl.
CPC ......... *H04W 92/20* (2013.01); *H04L 41/0826* (2013.01); *H04W 24/02* (2013.01); *H04W 88/08* (2013.01)

(58) Field of Classification Search
CPC ... H04W 52/343; H04W 92/20; H04W 88/08; H04W 24/02; H04W 72/1252; H04W 16/08; H04W 72/0426
(Continued)

(56) References Cited

U.S. PATENT DOCUMENTS

2010/0248723 A1* 9/2010 Yasuoka ............... H04W 92/20
455/436
2010/0323699 A1 12/2010 Hashimoto

FOREIGN PATENT DOCUMENTS

EP 2237606 A2 10/2010

OTHER PUBLICATIONS

Motorola: "X2 shutdown", 3GPP Draft; R3-081416, 3$^{rd}$ Generation Partnership Project (3GPP), Mobile Competence Centre; 650, Route Des Lucioles; F-06921 Sophia-Antipolis Cedex; France, vol. RAN WG3, No. Kansas City, USA; Apr. 30, 2008, Apr. 30, 2008 (Apr. 30, 2008), XP050164588.
(Continued)

*Primary Examiner* — Keith Ferguson
(74) *Attorney, Agent, or Firm* — Leydig, Voit & Mayer, Ltd.

(57) ABSTRACT

A method for communication between network nodes of a mobile communication network includes: establishing a communication interface between first and second base station entities, including generating a first communication interface at the first base station entity and a second communication interface instance at the second base station entity; transmitting a first removal message from the first base station entity—acting as a removal initiating base station entity among the base station entities—to the second base station entity—acting as a removal responding base station entity among the base station entities—and transmitting a second removal message from the second base station entity to the first base station entity, wherein the second
(Continued)

removal message comprises a benefit information, wherein the benefit information is indicative of a benefit value—for the second base station entity—of the communication interface between the base station entities.

13 Claims, 3 Drawing Sheets

(51) Int. Cl.
  *H04W 24/02* (2009.01)
  *H04W 88/08* (2009.01)
(58) Field of Classification Search
  USPC ......... 455/561, 525, 524, 445, 550.1, 422.1, 455/403, 436–444, 426.1, 426.2, 562.1; 1/1; 370/328, 329, 252, 254
  See application file for complete search history.

(56) References Cited

OTHER PUBLICATIONS

DTAG: "Correction X2 interface maintenance procedures", 3GPP Draft; R3-142412_Correction X2 Interface Maintenance Procedures, 3$^{rd}$ Generation Partnership Project (3GPP), Mobile Competence Centre; 650, Route Des Lucioles; F-06921 Sophia-Antipolis Cedex; F, vol. RAN WG3, No. Shanghai, P.R. China; Oct. 6, 2014-Oct. 10, 2014, Sep. 26, 2014 (Sep. 26, 2014), XP050870842.
Ericsson: "X2 Removal Functionality", 3GPP Draft; R3-142937, 3$^{rd}$ Generation Partnership Project (3GPP), Mobile Competence Centre; 650, Route Des Lucioles; F-06921 Sophia-Antipolis Cedex; France, vol. RAN WG3, No. San Francisco, USA; Nov. 17, 2014-Nov. 21, 2014, Nov. 7, 2014 (Nov. 7, 2014), XP050887223.

* cited by examiner

111: first base station entity
112: second base station entity
113: third base station entity
301: first removal message
302: second removal message
303: third removal message
304: fourth removal message
305: additional unconditional removal request 119: fifth base station entity
111: first base station entity
112: second base station entity
113: third base station entity
114: fourth base station entity
401: first processing step
402: second processing step
403: third processing step
404: fourth processing step
405: fifth processing step
406: sixth processing step
407: seventh processing step
408: eighth processing step

… (1)

METHOD FOR IMPROVED COMMUNICATION BETWEEN NETWORK NODES OF A MOBILE COMMUNICATION NETWORK, MOBILE COMMUNICATION NETWORK, PROGRAM AND COMPUTER PROGRAM PRODUCT

CROSS-REFERENCE TO RELATED APPLICATIONS

This application is a U.S. National Phase application under 35 U.S.C. § 371 of International Application No. PCT/EP2015/075051, filed on Oct. 29, 2015, and claims benefit to European Patent Application No. EP 14192695.6, filed on Nov. 11, 2014. The International Application was published in English on May 19, 2016 as WO 2016/074931 A1 under PCT Article 21(2).

FIELD

The present invention relates a method for improved communication between network nodes of a mobile communication network comprising at least a first base station entity and a second base station entity, wherein the base station entities are enabled to be able to communicate directly with each other using a communication interface between the two base station entities.

Furthermore, the present invention relates to a mobile communication network for improved communication between network nodes of the mobile communication network, the mobile communication network comprising at least a first base station entity and a second base station entity, wherein the base station entities are enabled to be able to communicate directly with each other using a communication interface between the two base station entities.

Additionally, the present invention relates to a base station entity configured to be used in exemplary embodiments of an inventive mobile communication network and/or configured to be used when executing exemplary embodiments of the inventive method.

Furthermore, the present invention relates to a program and a computer program product.

BACKGROUND

The exchange of packetized information in wireless communication systems (or mobile communication networks) has already grown dramatically and probably will also grow in the future due to the rapid adoption of data services in mobile communication networks. Compared to voice services, data requires significantly more traffic and, hence, a much lower cost per bit is needed. A considerable effort has therefore been put in the development of standards for the LTE RAN (Long Term Evolution Radio Access Network) and EPC (Evolved Packet Core), which address these evolving needs. Lower cost per bit can be achieved by using IP protocols, as due to the success of the Internet, the cost of Ethernet packet-based transport networks have fallen.

The X2 communication interface is a type of communication interface between base station entities of a mobile communication network, especially a mobile communication network according to or using the Long Term Evolution (LTE) radio access technology. Typically, the X2 communication interface connects neighboring base station entities, typically enhanced NodeBs (or eNodeBs) in a peer to peer fashion to assist handover and provide for rapid co-ordination of radio resources. In detail, this X2 communication interface can be distinguished between a user and a control plane.

Within the context of Self Organizing Networks (SON), in order to setup and maintain the X2 communication interface, there exist a couple of procedures and functions at the X2 communication interface. These procedures and functions are described in group 3GPP TS 36.423 of the standardization documents.

Typically over their lifetime, network nodes and respective interfaces in mobile communication networks are likely to be reconfigured several times while in operation.

These reconfigurations are necessary, because either network nodes themselves are physically reallocated, or, most likely, an additional network node has been deployed or removed or switched on or off in the vicinity (of, e.g., a base transceiver station) and hence necessitates a reconfiguration of the network nodes concerned (i.e. also those in the vicinity of such modifications).

The trend towards comparably small radio cells (or even more important the trend to customer owned network equipment like home (e)NodeBs), necessitates an increased number of reconfigurations (or a higher frequency of such reconfigurations) of network nodes and respective communication interfaces, e.g. simply as such devices can be switched on or off by customers and without the possibility of mobile network operators to influence such events. In turn, such an increased number of reconfigurations of network nodes and, of course, also of the respective communication interfaces between them, results in an increased maintenance effort for such reconfigurations of network nodes.

SUMMARY

A method for communication between network nodes of a mobile communication network, wherein the mobile communication network comprises an access network and a core network, wherein the access network comprises a plurality of base station entities, the plurality of base station entities comprising a first base station entity, a second base station entity, and further base station entities, wherein base station entities of the plurality of base station entities are enabled to be able to communicate directly with each other using respective communication interfaces between two base station entities of the plurality of base station entities, wherein the method includes: in a first step, establishing a communication interface between the first and second base station entities, wherein establishing the communication interface includes generating a first communication interface instance at the first base station entity and a second communication interface instance at the second base station entity; in a second step, subsequent to the first step, transmitting a first removal message from the first base station entity—acting as a removal initiating base station entity among the first and second base station entities—to the second base station entity—acting as a removal responding base station entity among the first and second base station entities; and in a third step, subsequent to the second step, transmitting a second removal message from the second base station entity to the first base station entity, wherein the second removal message comprises a benefit information, wherein the benefit information is indicative of a benefit value—for the second base station entity—of the communication interface between the first and second base station entities.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
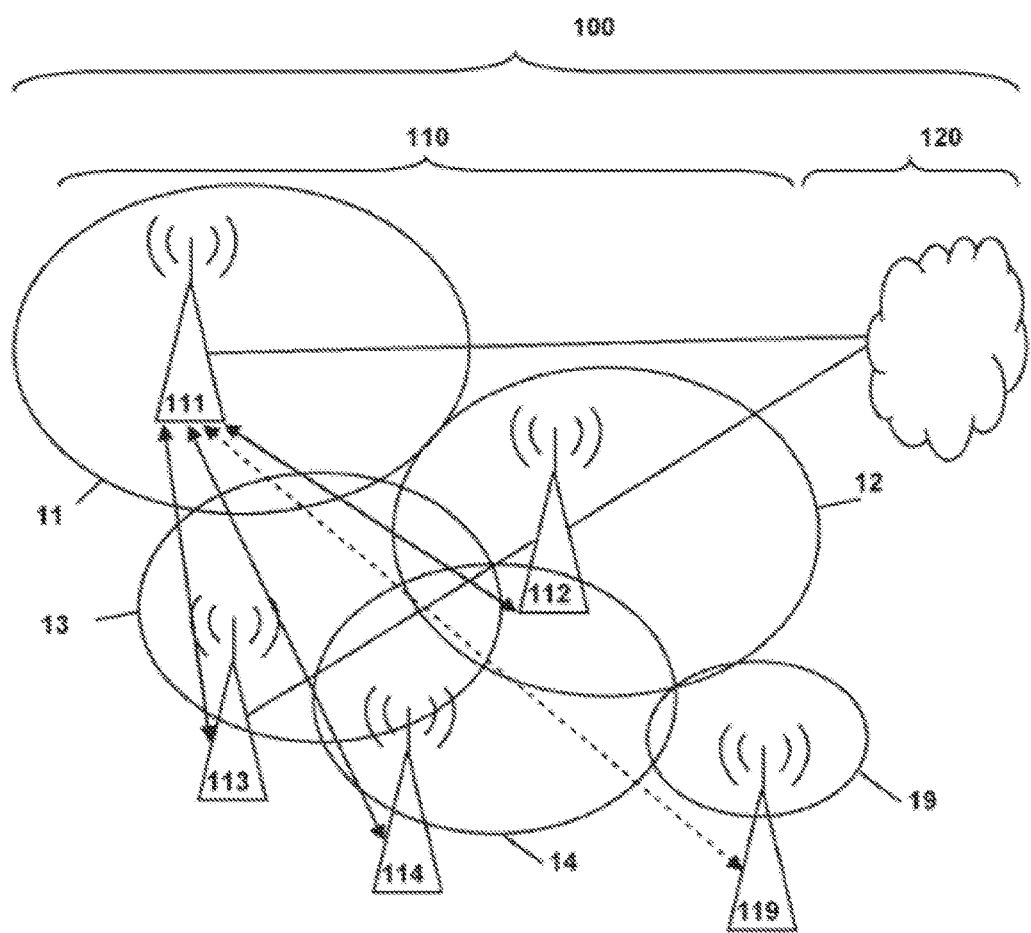
FIG. 1 schematically illustrates a mobile communication network with a core network, an access network, as well as a first base station entity, a second base station entity, a third base station entity, a fourth base station entity and a fifth base station entity.

Exemplary embodiments of the present invention provide a technically simple, effective and cost effective solution for an improved communication between the network nodes of a mobile communication network, especially between base station entities using the X2 communication interface such that the most efficient use can be made of the available network resources, especially regarding the number of X2 interfaces a given base station entity has, and regarding the other base station entities the given base station entity is connected to (via X2 interfaces). Exemplary embodiments of the present invention further provide a corresponding mobile communication network and corresponding base station entities configured to be used in such a mobile communication network and/or configured.

In an exemplary embodiment, the present invention provides a method for improved communication between network nodes of a mobile communication network, wherein the mobile communication network comprises an access network and a core network, wherein the access network comprises a plurality of base station entities, the plurality of base station entities comprising at least a first base station entity, a second base station entity, and further base station entities, wherein the base station entities of the plurality of base station entities are enabled to be able to communicate directly with each other using a communication interface between two base station entities, respectively, of the plurality of base station entities,
wherein in order to establish the communication interface between the first and second base station entities, a first instance of the communication interface is generated at the first base station entity and a second instance of the communication interface is generated at the second base station entity,
wherein the method comprises the following steps:
in a first step, the first and second instances of the communication interface are generated and the communication interface is established between the first and second base station entities, in a second step, subsequent to the first step, a first removal message is transmitted from the first base station entity—acting as removal initiating base station entity among the first and second base station entities—to the second base station entity—acting as removal responding base station entity among the first and second base station entities—and in a third step, subsequent to the second step, a second removal message is transmitted from the second base station entity to the first base station entity, wherein the second removal message comprises a benefit information, wherein the benefit information is indicative of a benefit value—for the second base station entity—of the communication interface between the first and second base station entities.

It is thereby advantageously possible according to the present invention that prior to removing a direct communication interface—especially an X2 communication interface—between two base station entities, especially eNodeB entities, an information regarding to the benefit of this communication interface is exchanged between the base station entities, especially from the removal responding base station entity towards the removal initiating base station entity.

According to a preferred embodiment of the present invention, the further base station entities comprise at least a third base station entity, wherein in order to establish the communication interface between the first and third base station entities, a third instance of the communication interface is generated at the first base station entity and a fourth instance of the communication interface is generated at the third base station entity, wherein—while the third and fourth communication interface is established between the first and third base station entities—in a fourth step, subsequent to the third step, a third removal message is transmitted from the first base station entity—acting as removal initiating base station entity among the first and third base station entities—to the third base station entity—acting as removal responding base station entity among the first and third base station entities—, and in a fifth step, subsequent to the fourth step, a fourth removal message is transmitted from the third base station entity to the first base station entity, wherein the fourth removal message comprises a further benefit information, wherein the further benefit information is indicative of a benefit value—for the third base station entity—of the communication interface between the first and third base station entities.

According to the present invention, the term "communication interface" or "direct communication interface" between two base station entities relates especially to the X2 communication interface between two eNodeBs—especially two neighboring eNodeBs, or eNodeBs that are located in the vicinity to each other. The direct communication interface between two base station entities according to the present invention is preferably a direct logical communication interface, i.e. the connection between the connected eNodeBs corresponding to the communication interface is a logical connection.

In a typical mobile communication network, a considerable number of network nodes are present (as part of the access network of the mobile communication network) having the functionality of base station entities. The environment (in terms of base station entities) of each base station entity of this plurality of base station entities comprises, typically, a certain number of base station entities. The environment of a given base station entity typically comprises a certain number of neighboring base station entities (or base station entities in the vicinity of the given base station entity). In principle, it is not excluded for the given base station entity to establish a direct communication interface (typically an X2 communication interface) to each one of these neighboring base station entities (or base station entities being in the vicinity). As the establishment of each of these communication interfaces requires (processing as well as memory and/or other) resources (at least of the given base station entity itself), there are typically restrictions related to the number of direct communication interfaces between the given base station entity and the base station entities of the environment of the given base station entity—hence an active management (adapted to the actual situation or configuration of the base station entities present and active in a certain part of the mobile communication network) is required regarding which one (or which ones) of the possible relations (in terms of communication interfaces) between the base station entity in question and the base station entities of its environment should be set up and maintained. For example, a given relation (between two given base station entities) may be of strong usage at one point in time (i.e. the respective communication interface between these two given base station entities is used frequently) but may become orphan due to a newly deployed network node (base station entity), e.g. placed "in between the two given base station entities", i.e. specifically serving a geographical area corresponding—at least partly—e.g., to the respective border areas of the radio cells of the two given base station entities: In such a situation and after the deployment of the new network node, usage of the communication interface between the two given base station entities will probably be reduced or even become completely orphan due to the newly deployed network node, hence the importance (or the benefit) of the (direct) communication interface between the two given base station entities is largely reduced, and, instead, the importance (or the benefit) of communication interfaces being established between each of the two given base station entities and the newly deployed base station entity (or network node), respectively, will be increased.

According to the present invention, benefit information, being indicative of a benefit value, is exchanged between the various base station entities such that an automatic management of the various relations (and corresponding communication interfaces) between the base station entities is possible.

In order to precisely describe the communication between the various base station entities, it is assumed—in the context of the present invention—that, in a first step, two base station entities exist having a direct (logical) communication interface between each other, i.e. between a first base station entity and a second base station entity. The two base station entities are enabled to be able to communicate directly with each other using the communication interface (i.e. especially the X2 communication interface) between these two base station entities. The communication interface between the first and second base station entity is actually established by generating a first instance of the communication interface at the first base station entity and by generating a second instance of the communication interface at the second base station entity.

The existence of the direct (logical) communication interface between the first and second base station entity means that in a first step, the first and second instances of the communication interface are generated and the communication interface is established between the first and second base station entities.

In a second step, subsequent to the first step, a situation might occur where—for one reason or another—the communication interface is either not required by one of the first and second base station entity or it is required that the communication interface be removed. In the context of the present invention, it is assumed that—among the first and second base station entities—there is one base station entity that requests or initiates the removal of the communication interface and the other base station entity responds to that request or initiation. In the context of the present invention, the first base station entity is requesting the removal and is also called the removal initiating base station entity, and the second base station entity is also called the removal responding base station entity; however, the roles of removal initiating base station entity and removal responding base station entity could, of course, also be reversed. Therefore during the second step, the first base station entity (i.e. the removal initiating base station entity) transmits a first removal message to the second base station entity (i.e. the removal responding base station entity).

In a third step, subsequent to the second step, a second removal message is transmitted from the second base station entity to the first base station entity, the second removal message comprising a benefit information (of the second base station entity or related to the second base station entity, i.e. the removal responding base station entity), the benefit information being indicative of a benefit value (for the second base station entity of the communication interface between the first and second base station entities).

According to the present invention, in such a situation, the first and second instances of the communication interface can be removed and the communication interface between the first and second base station entities be disabled according to a protocol that assures the coordination of the removal within both the first and the second base station entity, and on the basis of (or dependent on) the benefit information, i.e. the benefit information (transmitted by the (removal responding) second base station entity).

The importance of taking into consideration—when removing a communication interface—the benefit information is especially important in case that not only one relation of the removal initiation base station entity (i.e. the first base station entity) is considered but also at least a second one. This situation is typically verified, i.e. in typical deployment scenarios of base station entities, each one or at least the majority of base station entities will have at least two (if not more) relations with established communication interfaces towards neighboring base station entities. Again, in order to precisely describe the communication between the various base station entities, three base station entities are considered in a second step, the first base station entity having a direct (logical) communication interface towards the second base station entity (using—as in the first step—the first and second instance of the communication interface) and to the third base station entity (using a third instance of the communication interface (at the first base station entity) and a fourth instance of the communication interface (at the third base station entity)).

The existence of the direct (logical) communication interface between the first and second base station entities and between the first and third base station entities means that in a first step, the first and second instances of the communication interface as well as the third and fourth instances of the communication interface are generated and the respective communication interfaces are established.

In the situation described in relation to the second step, i.e. in case that—for one reason or another—the communication interface between the first and third base station entities is either not required by one of the first and third base station entities or it is required that the communication interface be removed (or in case that—for one reason or another—at least one of the communication interfaces between the first and third base station entities or the first and second base station entities is either not required by one of the first and third base station entities or it is required that at least one of the communication interfaces be removed), one of the involved base station entities requests or initiates the removal of the communication interface and the other base station entity responds to that request or initiation. In the second step, the first base station entity (acting as removal initiating base station entity among the first and second base station entities) transmits the first removal message to the second base station entity (acting as removal responding base station entity among the first and second base station entities). Subsequently (to the second step but preferably to the above mentioned third step), in a fourth step, a third removal message is transmitted from the first base station entity—acting as removal initiating base station entity among the first and third base station entities—to the third base station entity—acting as removal responding base station entity among the first and third base station entities. Subsequently, in a fifth step, a fourth removal message is transmitted from the third base station entity to the first base station entity, the fourth removal message comprising a further benefit information (of the third base station entity or related to the third base station entity, i.e. the removal responding base station entity among the first and third base station entities), the further benefit information being indicative of a benefit value (for the third base station entity of the communication interface between the first and third base station entities). According to the present invention, in such a situation and via both the benefit information (from the second base station entity) and the further benefit information (from the third base station entity), it is advantageously possible, for the first base station entity, to make any decision about whether to remove (or to request to remove) the communication interface towards the second base station entity rather than the communication interface towards the third base station entity (or vice versa) on a solid and informed basis.

Furthermore, it is preferred according to the present invention that—depending on the benefit information, received from the second base station entity, and depending on the further benefit information, received from the third base station entity,—in a sixth step, subsequent to the fifth step, one of either the first and second instances of the communication interface are removed, and thereby the communication interface between the first and second base station entities disabled, or the third and fourth instances of the communication interface are removed, and thereby the communication interface between the first and third base station entities disabled, wherein especially removal of the respective instances of the communication interface and, correspondingly, disabling of the respective communication interface is performed by an additional unconditional removal request transmitted by the removal initiating base station entity towards the respective removal responding base station entity.

According to a further preferred embodiment of the present invention, the first and/or second instances of the communication interface (and/or the third and/or fourth instances of the communication interface) are removed only in case that the second (fourth) removal message is received by the first base station entity (removal initiating base station entity) within a predetermined removal time interval.

Thereby, it is advantageously possible that a removal request (first or third removal message) to remove the communication interface between two base station entities is not followed by a removal attempt at the removal initiating base station entity in case that removal request leads to an error situation (e.g. the removal request is not received by the removal responding base station entity or the removal request is not properly handled within the removal responding base station entity).

Thereby, it is advantageously possible to base the decision, which one of the communication interfaces towards the second base station entity and/or towards the third base station entity is to be removed, on a sound and informed basis.

According to a preferred embodiment of the present invention, a first interface benefit value and a second interface benefit value is computed by the first base station entity, the first interface benefit value being related to the importance—for the first base station entity—of the communication interface towards the second base station entity and the second interface benefit value being related to the importance—for the first base station entity—of the communication interface towards the third base station entity, and wherein, in the sixth step, the decision for removing the first and second instances of the communication interface rather than the third and fourth instances of the communication interface or vice versa also depends—besides the benefit information and the further benefit information—on the first interface benefit value and a second interface benefit value.

Thereby, it is advantageously possible according to the present invention to base the decision, which one of the various communication interfaces of the first base station entity should be removed, on an even more solid basis. For example, it is advantageously possible according to the present invention that the overall benefit value of a communication interface between two base station entities is based not only on the benefit value associated with the removal responding base station entity but also with the benefit value associated with the removal initiating base station entity (i.e. in case of the described example: E.g., the overall benefit value of the communication interface between the first and second base station entities can be established—at the first base station entity (i.e. removal initiating base station entity)—based on the benefit information transmitted by the second base station entity (as part of the second removal message), and on the first interface benefit value). In this manner, it is advantageously possible according to the present invention to generate (at, e.g., the first base station entity, but also at other base station entities, then acting as "first base station entity", i.e. removal initiating base station entities) a priority list—based on the various overall benefit values associated to the different communication interfaces of that base station entity—depending on which the actual (unconditional) removal of communication interfaces is initiated.

In the above exemplary description, for the sake of simplicity, only three base station entities have been considered. However, in a typical deployment of a mobile communication network, a typical base station entity (acting as "first base station entity", i.e. initiating the removal of existing communication interfaces) maintains more than two different communication interfaces. Therefore, it is preferred according to the present invention that additional base station entities of the further base station entities transmit additional benefit information pieces to the first base station entity, and, correspondingly, additional interface benefit values are generated by the first base station entity.

According to a further preferred embodiment of the present invention, the first removal message or both the first removal message and the third removal message is a conditional removal request to the respective removal responding base station entity, or an inquiry message in view of obtaining the benefit information or both the benefit information and the further benefit information.

By using conditional removal requests, it is advantageously possible according to the present invention to efficiently communicate and manage the different relations of communication interfaces between a number of base station entities. Especially, it is advantageously possible that, e.g., the first base station entity (or removal initiating base station entity) sends the first removal message to the second base station entity, especially based on the corresponding (first) interface benefit value being the lowest interface benefit value among the communication interfaces activated or maintained at the first base station entity. In case that the second base station entity reports a benefit information corresponding to a comparatively low benefit value (resulting in an acceptance of the conditional removal request received by the second base station entity), the communication interface between the first and second base station entities is removed in accordance with the present invention, i.e. especially in a coordinated manner (without necessitating further or additional messages to be transmitted in either direction between the concerned base station entities). By using inquiry messages (i.e. the first removal message is to be interpreted as being a mere inquiry message requesting the transmission of the benefit information (as part of the second removal message) by the second base station entity, and the third removal message is to be interpreted as being a mere inquiry message requesting the transmission of the further benefit information (as part of the fourth removal message) by the third base station entity), it is advantageously possible—for the first base station entity—to assess the current situation related to the currently activated communication interfaces, and to send an unconditional removal request to the base station entity (among the second and third base station entities) such that the removal of the corresponding communication interface has the least negative impact on the overall functionality of the mobile communication network.

According to still a further preferred embodiment of the present invention, the benefit information and the further benefit information, and especially also the first interface benefit value and the second interface benefit value, relates to a normalized benefit value, respectively, especially a normalized value between and including the values of 0 and 1 or a normalized value between and including the values of 0 and 100 or a normalized value between and including 0 and a value of the sum of −1 and a power of 2.

By normalizing the benefit information and/or the further benefit information and/or the first interface benefit value and/or the second interface benefit value, it is advantageously possible to simply determine the least important relation of a communication interface. Regarding the transmission format of the benefit information (and/or of the further benefit information), it is advantageously possible that the exchange of these pieces of information is based on a common representation of the normalization such that especially one of the following cases apply:

the situation of highest importance of the communication interface is expressed as a benefit information (or further benefit information) of 1 (or 100) and the situation of lowest importance of the communication interface is expressed as a benefit information (or further benefit information) of 0 (or vice versa)—in case that the normalized value is a value between and including 0 and 1 (or a normalized value between and including 0 and 100);

the situation of highest importance of the communication interface is expressed as a benefit information (or further benefit information) of 2n−1 (such as 3, 7, 15, 31, 63, 127, 255) and the situation of lowest importance of the communication interface is expressed as a benefit information (or further benefit information) of 0 (or vice versa)—in case that the normalized value is a value between and including 0 and a value of the sum of −1 and a power of 2.

According to a preferred embodiment of the present invention, the benefit value and the further benefit value, and especially also the first interface benefit value and the second interface benefit value, are computed taking into consideration one indicator or a plurality of indicators, the indicator or the plurality of indicators especially comprising but are not limited to:

the number of handover procedures handled per predetermined time interval using the respective communication interface, the availability and/or actual usage of functional features at the respective base station entities involved, an indicator or a plurality of indicators related to the load information, an indicator or a plurality of indicators related to interference parameters.

Thereby, it is advantageously possible to easily and effectively take into consideration a plurality of different situations or reasons to maintain or to continue to support a communication interface between two base station entities. Especially, it is advantageously possible that the benefit value and the further benefit value, and especially also the first interface benefit value and the second interface benefit value, are computed based the use of a normalization procedure and the use weighting factors, a weighting factor being assigned to each one of the different parameters (such as the number of handover procedures handled per predetermined time interval and/or the availability and/or actual usage of functional features at the respective base station entities and/or the load information and/or the interference parameters).

According to a preferred embodiment of the present invention, the removal of the first and second instances of the communication interface or of the third and fourth instances of the communication interface and correspondingly disabling of the communication interface between the first and second base station entities or between the first and third base station entities is performed in a coordinated manner.

Thereby, it is meant that the removal of a direct communication interface between two base station entities is performed involving both base station entities concerned, i.e. is performed in a consensual manner. It is thereby advantageously possible that reasons against the removal of the communication interface, such reasons existing in only one of the base station entities involved, can be taken into consideration for the decision whether to remove the communication interface or not.

In practice, the conventionally known setup procedure relating to the X2 communication interface (i.e. the communication interface) typically works until the maximum amount of supported X2 interfaces (or of instances of such a communication interface) is reached at an eNodeB (i.e. a base station entity). In case that a further communication interface (relating to a specific base station entity or eNodeB)—i.e. a further instance of such a communication interface—is requested (typically by another (neighboring) base station entity), one of the instances of the communication interface of that base station entity (or eNodeB) needs to be removed. According to the present invention, this removal is performed in coordination with the other concerned eNodeB (or base station entity) that acts as the communication partner of the communication interface (or X2 interface relation) to be removed. In case of an uncoordinated removal of the communication interface (or X2 interface) between two eNodeBs (or base station entities), undefined situations can occur where the behaviour of the other peer eNodeB base station entity is not exactly specified, e.g. due to an attempted removal of an instance of the communication interface at one of the connected base station entities without a removal of the corresponding other instance of that same communication interface at the other of the connected base station entities.

Furthermore, it is preferred according to the present invention that the first and second instances (third and fourth instances) of the communication interface are generated and the communication interface is established between the first and second base station entities (first and third base station entities) by transmitting at least a first setup message from a setup initiating base station entity among the first and second base station entities (third setup message from a setup initiating base station entity among the first and third base station entities) and at least a second setup message from a setup responding base station entity among the first and second base station entities (fourth setup message from a setup responding base station entity among the first and third base station entities).

Thereby, it is advantageously possible to establish a communication interface between the first and second base station entity (first and third base station entity) easily and effectively, independent from which one of the first base station entity and the second (third) base station entity is initiating (or responding to) the setup of the communication interface.

Furthermore, the present invention relates to a mobile communication network for improved communication between network nodes of the mobile communication network, wherein the mobile communication network comprises an access network and a core network, wherein the access network comprises a plurality of base station entities, the plurality of base station entities comprising at least a first base station entity, a second base station entity, and further base station entities, wherein the base station entities of the plurality of base station entities are enabled to be able to communicate directly with each other using a communication interface between two base station entities, respectively, of the plurality of base station entities,
wherein in order to establish the communication interface between the first and second base station entities, a first instance of the communication interface is generated at the first base station entity and a second instance of the communication interface is generated at the second base station entity,
wherein the mobile communication network is configured such that:

the first and second instances of the communication interface are generated and the communication interface is established between the first and second base station entities, a first removal message is transmitted from the first base station entity—acting as removal initiating base station entity among the first and second base station entities—to the second base station entity—acting as removal responding base station entity among the first and second base station entities—and a second removal message is transmitted from the second base station entity to the first base station entity, wherein the second removal message comprises a benefit information, wherein the benefit information is indicative of a benefit value—for the second base station entity—of the communication interface between the first and second base station entities.

Additionally, it is preferred according to the present invention—especially with respect to the mobile communication network—that the further base station entities comprise at least a third base station entity, wherein the mobile communication network is configured such that—in order to establish the communication interface between the first and third base station entities—a third instance of the communication interface is generated at the first base station entity and a fourth instance of the communication interface is generated at the third base station entity, wherein the mobile communication network furthermore configured such that—in case that the third and fourth communication interface is established between the first and third base station entities—, a third removal message is transmitted from the first base station entity—acting as removal initiating base station entity among the first and third base station entities—to the third base station entity—acting as removal responding base station entity among the first and third base station entities—, and a fourth removal message is transmitted from the third base station entity to the first base station entity, wherein the fourth removal message comprises a further benefit information, wherein the further benefit information is indicative of a benefit value—for the third base station entity—of the communication interface between the first and third base station entities.

It is furthermore preferred according to the present invention—also with respect to the mobile communication network—that the mobile communication network is configured such that—depending on the benefit information, received from the second base station entity, and depending on the further benefit information, received from the third base station entity—one of either the first and second instances of the communication interface are removed, and thereby the communication interface between the first and second base station entities disabled, or the third and fourth instances of the communication interface are removed, and thereby the communication interface between the first and third base station entities disabled, wherein especially removal of the respective instances of the communication interface and, correspondingly, disabling of the respective communication interface is performed by an additional unconditional removal request transmitted by the removal initiating base station entity towards the respective removal responding base station entity.

Furthermore, the present invention relates to a base station entity configured to be used in exemplary embodiments of an inventive mobile communication network and/or configured to be used when executing exemplary embodiments of an inventive method according to the present invention.

Additionally, the present invention relates to a program comprising a computer readable program code which, when executed on a computer and/or on a base station entity and/or on a network component of a mobile communication network or in part on a first base station entity and in part on a second base station entity, causes the computer and/or the base station entity and/or the network component of the mobile communication network to perform exemplary embodiments of the inventive method.

Still additionally, the present invention relates to computer program product for improved communication between network nodes of a mobile communication network, the computer program product comprising a computer program stored on a storage medium, the computer program comprising program code which, when executed on a computer and/or on a base station entity and/or on a network component of a mobile communication network or in part on a first base station entity and in part on a second base station entity, causes the computer and/or the base station entity and/or the network component of the mobile communication network to perform exemplary embodiments of the inventive method.

These and other characteristics, features and advantages of the present invention will become apparent from the following detailed description, taken in conjunction with the accompanying drawings, which illustrate, by way of example, the principles of the invention. The description is given for the sake of example only, without limiting the scope of the invention. The reference figures quoted below refer to the attached drawings.

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes.

Where an indefinite or definite article is used when referring to a singular noun, e.g. "a", "an", "the", this includes a plural of that noun unless something else is specifically stated.

Furthermore, the terms first, second, third and the like in the description and in the claims are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

In FIG. 1, a mobile communication network 100, especially a public land mobile network, is schematically shown, the mobile communication network 100 comprising an access network 110 and a core network 120. The core network 120 is only schematically shown by means of a cloud representation. The mobile communication network 100 is preferably a cellular telecommunications network comprising typically a plurality of network cells, three of which are represented in FIG. 1 by means of a solid line and reference signs 11 (first radio cell), 12 (second radio cell), 13 (third radio cell), 14 (fourth radio cell) and 19 (fifth radio cell). In the telecommunications network, typically a plurality of user equipments (not represented in FIG. 1) are camping on the telecommunications network within the network cells 11, 12, 13, 14, 19, i.e. the user equipments are connected or are camping on a first base station entity 111, the first base station entity 111 serving the first radio cell 11, or on a second base transceiver station 112, the second base transceiver station 112 serving the second radio cell 12, or on a third base transceiver station 113, the third base transceiver station 113 serving the third radio cell 13, or on a fourth base transceiver station 114, the fourth base transceiver station 114 serving the fourth radio cell 14, or on a fifth base transceiver station 119, the fifth base transceiver station 119 serving the fifth radio cell 19. The first, second, third, fourth, and fifth base transceiver stations 111, 112, 113, 114, 119 are typically base transceiver stations, e.g. typically an eNodeB in case of LTE. In a typical mobile communication network 100, the access network 110 normally comprises more than these five base station entities 111, 112, 113, 114, 119, i.e. there are other or further base station entities present that are not part of the access network 110. In general in a typical mobile communication network, a base station entity can be responsible for more than one radio cells or cell sectors.

According to the present invention, the first base station entity 111 is connected by a communication interface (represented by three double-arrows) to the second base station entity 112, the third base station entity 113, and the fourth base station entity 114: one between the first base station entity 111 and the second base station entity 112 in FIG. 1, one between the first base station entity 111 and the third base station entity 113, and one between the first base station entity 111 and the fourth base station entity 114, especially an X2 interface between eNodeBs. A double-arrow with a dashed line is represented between the first base station entity 111 and the fifth base station entity 119, indicating a request of the fifth base station entity 119 to establish a communication interface with the first base station entity 111.

The communication interface between the first base station entity 111 and second base station entity 112 relates to a first instance of the communication interface at the first base station entity 111 and to a second instance of the communication interface at the second base station entity 112. The communication interface between the first base station entity 111 and third base station entity 113 relates to a third instance of the communication interface at the first base station entity 111 and to a fourth instance of the communication interface at the third base station entity 113. According to the present invention, either one of these two communication interfaces can be removed in a coordinated manner by exchanging messages between the first base station entity 111 on the one hand and the second and/or third base station entity 112, 113 on the other hand. This is further detailed in connection with the description of FIG. 2.

As the establishment of each of these communication interfaces requires resources at least of the given base station entity itself, there are typically restrictions related to the number of direct communication interfaces between base station entities. Setting up a communication interface usually just relies on availability of free interface resources. It can be assumed that the interface requesting network node (in FIG. 1, it is exemplarily the fifth base station entity 119) is benefiting in setting up (or requesting the setup of) this particular communication interface. As long as the number of available interfaces is not limited, this approach works fine, as there are no "costs" in terms of preventing the setup of other communication interfaces. However if the number of available interfaces is getting constrained, e.g. by reaching implementation limits or by reaching the maximum number of available addresses etc., less frequently used or less important communication interfaces should be removed, or reconfigured towards new nodes having an increased benefit of setting up a communication interface.

According to the present invention there can be several reasons why a communication interface between base station entities are needed. In the past, the main purpose of, e.g., the X2 interface was to signal HANDOVER REQUEST messages and to forward user plane date not being transmitted to the user equipment, during the hand over process. However, presently several other features using the X2 interface to signal commands and conditions are added, e.g. LOAD INFORMATION over X2 is carrying information to support the handover decision and to reduce interference between base station entities in case of hierarchical cell deployments etc. The benefit of the existence of a communication interface between two given base station entities (i.e. whether the communication interface can be removed or not) is difficult to assess based solely upon whether a certain feature is supported in one of the peer nodes or not; such an assessment also depends on the usage, i.e. to which degree a certain feature is used or more precisely to which degree the communication interface contributes to the benefits for the served customers. Therefore, any mechanism to support autonomous management of communication interfaces should take into account:

already enabled functionality in the base station entity,
possible future features enabled in the base station entity,
respective usage of a certain communication interface between different base station entities,
alternative signaling methods (e.g. the support via the S1 communication interface instead of the X2 communication interface) to support a certain functionality in the base station entity.

The parameter transmitted (or signaled) between the peer nodes, i.e. between the base station entities, upon a node is able to decide whether an certain communication interface shall be kept (or maintained) or removed, may be different in different exemplary embodiments; furthermore different network operators may have different priorities once a communication interface is subject to be removed.

According to the present invention, in order to allow the base station entities (or network nodes) to autonomously take a decision which communication interface out of the different communication interface of a given base station entity should be removed or maintained, the given base station entity receives pieces of benefit information indicative of benefit values of the communication interfaces from the perspective of the connected base station entities, and the given base station entity preferably also generates analogous information related to the benefit of these communication interfaces.

Figure 2:
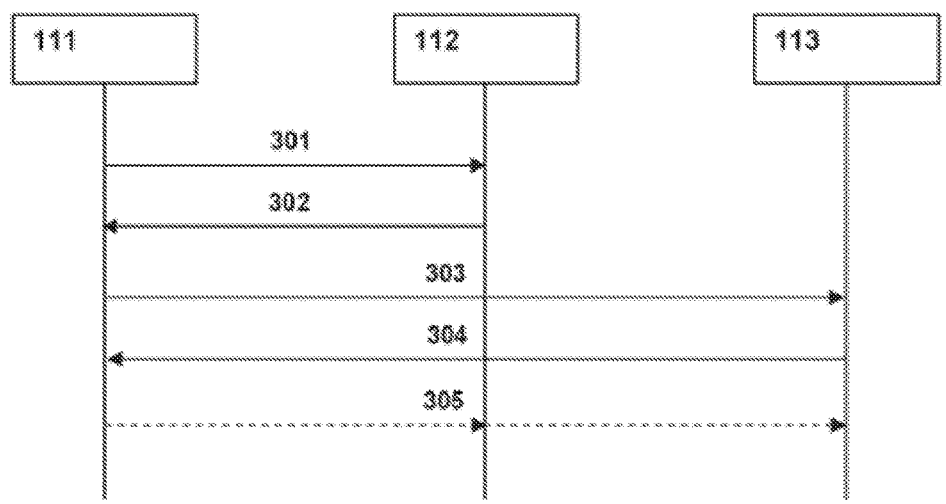
FIG. 2 schematically illustrates a communication diagram according to the present invention between the first, second and third base station entities transmitting pieces of benefit information towards the first base station entity.

In FIG. 2, a communication diagram according to the present invention between the first, second and third base station entities 111, 112, 113 transmitting pieces of benefit information towards the first base station entity 111 is schematically represented. Of course, it is to be understood that such a scenario describes only a part of the mobile communication network 100 comprising a considerable number of network nodes (or base station entities) as part of the access network 110. The second and third base station entities 112, 113 are neighboring base station entities (or base station entity in the vicinity) with respect to the first base station entity 111 and it is supposed that a direct communication interface (typically an X2 communication interface) is established—during a first step between the first base station entity 111 and the second base station entity 112 (via the first and second instance of the communication interface being generated, the first instance of the communication interface at the first base station entity 111 and the second instance of the communication interface at the second base station entity 112) and/or between the first base station entity 111 and the third base station entity 113 (via the third and fourth instance of the communication interface being generated, the third instance of the communication interface at the first base station entity 111 and the fourth instance of the communication interface at the second base station entity 112). In case that the first base station entity 111 needs to remove one communication interface, a first removal message 301 is transmitted, in a second step, from the first base station entity 111—acting as removal initiating base station entity among the first and second base station entities 111, 112—to the second base station entity 112—acting as removal responding base station entity among the first and second base station entities 111, 112. In a third step, a second removal message 302 is transmitted from the second base station entity 112 to the first base station entity 111, wherein the second removal message 302 comprises a benefit information, wherein the benefit information is indicative of a benefit value—for the second base station entity 112—of the communication interface between the first and second base station entities 111, 112. In a fourth step, a third removal message 303 is transmitted from the first base station entity 111—acting as removal initiating base station entity among the first and third base station entities 111, 113—to the third base station entity 113—acting as removal responding base station entity among the first and third base station entities 111, 113. In a fifth step, subsequent to the fourth step, a fourth removal message 304 is transmitted from the third base station entity 113 to the first base station entity 111, wherein the fourth removal message 304 comprises a further benefit information, wherein the further benefit information is indicative of a benefit value—for the third base station entity 113—of the communication interface between the first and third base station entities 111, 113. In the exemplary situation represented in FIG. 2, depending on the benefit information (received from the second base station entity 112) and/or on the further benefit information (received from the third base station entity 113) a sixth step is executed during which either the first and second instances of the communication interface are removed, and thereby the communication interface between the first and second base station entities 111, 112 disabled, or the third and fourth instances of the communication interface are removed, and thereby the communication interface between the first and third base station entities 111, 113 disabled. Especially, this is performed by an additional unconditional removal request 305 transmitted by the removal initiating base station entity (first base station entity 111) towards the respective removal responding base station entity (second or third base station entity 112, 113).

According to the present invention, the benefit information to be signaled between different base station entities may be different in different embodiments, but in general should take into account the usage and the importance of certain features relying on the communication interface that is requested (in the examples given: by the first base station entity 111) to be removed.

The benefit information or benefit value is, e.g., normalized to lie in a range between, e.g., 0 and 100, i.e. the interval [0-100], comprising 0 and 100 as well. In case a base station entity—among the second and third base station entities 112, 113 in the example given—signaled a value of 0, it shall, e.g., be assumed that there is no benefit for that base station entity (i.e. the second or third base station entity 112, 113) to keep the communication interface maintained; the communication interface can be removed (without any customer impact for the base station entity signaling this value). In case a base station entity—among the second and third base station entities 112, 113 in the example given—signaled a value of 100, it shall, e.g., be assumed that the communication interface is most beneficial for that base station entity and cannot be removed at all.

According to the present invention, such a behavior can be achieved, e.g., by taking into consideration—in order to compute the benefit value—a certain number of input parameters $X_i$ representing the usage of a certain feature or functionality. E.g., in case of the handover functionality, the corresponding input parameter $X_i$ might be the number of handovers per given time interval. The input parameter $X_i$ is preferably subjected to a moving averaging function in order to prevent spikes from being misinterpreted. Furthermore, a normalization is applied and the result multiplied by a weighting factor $p_i$. The weighting by the weighting factor $p_i$ after normalization allows for the possibility of a manual adjustment, respectively a tuning of the process to compute the benefit value in order to adapt to local and/or network operator preferences.

According to the present invention, it is advantageously possible that a plurality of input channels or input parameters $X_i$ exist, depending on the number of features/functions seen as important for the calculation of the benefit value, expressing the need for a certain communication interface towards another base station entity. A normalization function is applied in order for the calculated benefit value to be independent of the number of input parameters. Furthermore, it is advantageously possible according to the present invention to be able to handle future features in a backwards compatible manner.

Figure 3:
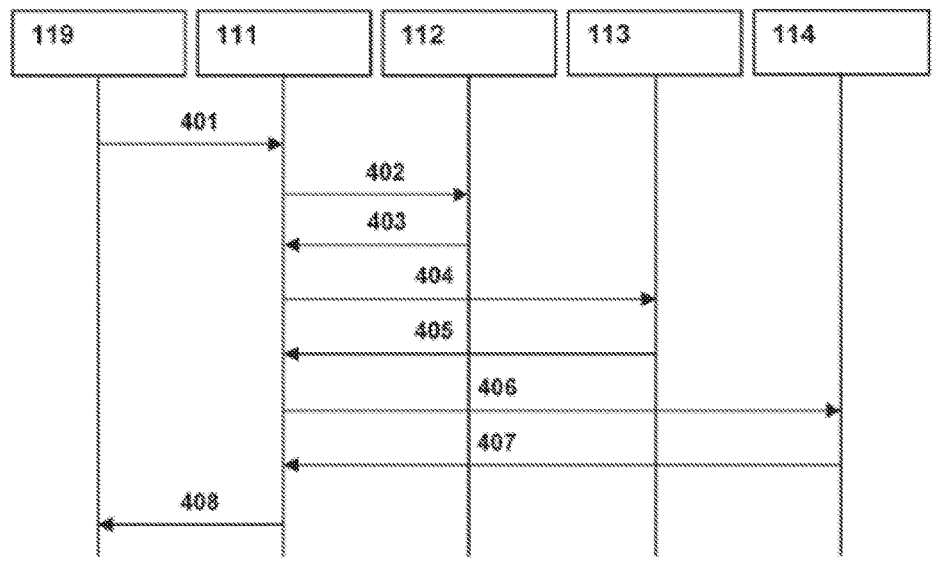
FIG. 3 schematically illustrates a communication diagram according to the present invention between the first, second, third, fourth, and fifth base station entities illustrating an example according to the present invention.

In FIG. 3, a communication diagram according to the present invention between the first, second, third, fourth, and fifth base station entities 111, 112, 113, 114, 119 illustrating an example of the functionality according to the present invention is schematically represented. In this example, it is assumed that each base station entity (or network node, eNodeB) calculates the interface benefit values (i.e. the first interface benefit value, the second interface benefit value, etc.) for all communication interfaces connect to this node or this base station entity. In case the number of available communication interfaces is getting close to or is reaching the limit of available communication interfaces, the base station entity will try to maintain the communication interfaces that are already established and will have the respective communication interface benefit values computed.

Upon reception of the X2 SETUP REQUEST message, the base station entity (in the examples the first base station entity 111) is comparing the interface benefit values of all already existing communication interfaces. In case of a lack of available interface instances (or resources), the base station entity will start to request the removal of an interface having the lowest interface benefit value.

According to a preferred embodiment of the present invention, an initial estimated interface benefit value is transmitted to the setup responding base station entity (in the example the first base station entity 111) from the setup initiating base station entity (in the example the fifth base station entity 119), e.g. as part of the setup request (e.g. X2 SETUP REQUEST). In case such an initial estimated interface benefit value is received by the base station entity in question (i.e. the first base station entity 111 in the example), and in case of a lack of available interface instances (or resources), the base station entity will start to request the removal of an interface having the lowest interface benefit value out of the ones having a lower interface benefit value than the an initial estimated interface benefit value transmitted by the incoming interface setup request (e.g. X2 SETUP REQUEST).

In FIG. 3, the X2 SETUP REQUEST is transmitted, during a first processing step 401, by the fifth base station entity 119 to the first base station entity 111. By this message, the fifth base station entity 119 is requesting (the establishment of) a communication interface towards the first base station entity 111. In the example shown, it is assumed that the first base station entity 111 is lacking free interface resources, and, hence, needs to remove an existing communication interface prior to being able to positively respond to the setup request of the fifth base station entity 119. The setup request preferably comprises an initial estimated interface benefit value. The first base station entity 111 starts to issue removal messages (or removal request messages) towards other base station entities, beginning with the base station entity (in the example the second base station entity 112) having the least interface benefit value according to what the first base station entity 111 has computed.

In a second processing step 402, the first removal message is transmitted from the first base station entity 111 to the second base station entity 112. In a third processing step 403, the second removal message is transmitted from the second base station entity 112 to the first base station entity 111. The second removal message comprises the benefit information, being indicative of a benefit value of the communication interface between the first and second base station entities 111, 112 from the point of view of the second base station entity 112. In the present example, it will be assumed that the benefit value BV2 corresponding to the benefit information transmitted by the second base station entity 112 verifies 100>BV2>0, indicating that the second base station entity 112 does not accept to remove the communication interface. Therefore, the first base station entity 111 will continue to request the removal of existing communication interfaces.

In a fourth processing step 404, the third removal message is transmitted from the first base station entity 111 to the third base station entity 113. In a fifth processing step 405, the fourth removal message is transmitted from the third base station entity 113 to the first base station entity 111. The fourth removal message comprises the further benefit information, being indicative of a benefit value of the communication interface between the first and third base station entities 111, 113 from the point of view of the third base station entity 113. In the present example, it will be assumed that the benefit value BV3 corresponding to the further benefit information transmitted by the third base station entity 113 verifies 100>BV3>BV2>0, indicating that the third base station entity 113 does neither accept to remove the communication interface. Therefore, the first base station entity 111 will continue to request the removal of existing communication interfaces.

In a sixth processing step 406, a further removal message is transmitted from the first base station entity 111 to the fourth base station entity 114. In a seventh processing step 407, another further removal message is transmitted from the fourth base station entity 114 to the first base station entity 111. The other further removal message comprises an additional benefit information, being indicative of a benefit value of the communication interface between the first and fourth base station entities 111, 114 from the point of view of the fourth base station entity 114. In the present example, it will be assumed that the benefit value BV4 corresponding to the additional benefit information transmitted by the fourth base station entity 114 verifies BV4=0, indicating that the fourth base station entity 114 accept to remove the communication interface. Consequently, the communication interface between the first and the fourth base station entity 111, 114 is removed.

In an eighth processing step 408, the first base station entity 111 grants the interface setup between the fifth base station entity 119 and the first base station entity 111.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method for communication between network nodes of a mobile communication network, wherein the mobile communication network comprises an access network and a core network, wherein the access network comprises a plurality of base station entities, the plurality of base station entities comprising a first base station entity, a second base station entity, and further base station entities, wherein base station entities of the plurality of base station entities are enabled to be able to communicate directly with each other using respective communication interfaces between two base station entities of the plurality of base station entities, wherein the method comprises:

in a first step, establishing a communication interface between the first and second base station entities, wherein establishing the communication interface includes generating a first communication interface instance at the first base station entity and a second communication interface instance at the second base station entity;

in a second step, subsequent to the first step, transmitting a first removal message from the first base station entity—acting as a removal initiating base station entity among the first and second base station entities—to the second base station entity—acting as a removal responding base station entity among the first and second base station entities; and in a third step, subsequent to the second step, transmitting a second removal message from the second base station entity to the first base station entity, wherein the second removal message comprises a benefit information, wherein the benefit information is indicative of a benefit value—for the second base station entity—of the communication interface between the first and second base station entities.

2. The method according to claim 1, wherein the further base station entities comprise a third base station entity, wherein a communication interface between the first and third base station entities comprises a third communication interface instance at the first base station entity and a fourth communication interface instance at the third base station entity, and wherein the method further comprises:

in a fourth step, subsequent to the second step, transmitting a third removal message from the first base station entity—acting as a removal initiating base station entity among the first and third base station entities—to the third base station entity—acting as a removal responding base station entity among the first and third base station entities; and in a fifth step, subsequent to the fourth step, transmitting a fourth removal message from the third base station entity to the first base station entity, wherein the fourth removal message comprises a further benefit information, wherein the further benefit information is indicative of a benefit value—for the third base station entity—of the communication interface between the first and third base station entities.

3. The method according to claim 2, wherein the method further comprises:— depending on the benefit information, received from the second base station entity, and depending on the further benefit information, received from the third base station entity, in a sixth step, subsequent to the fifth step, either disabling the communication interface between the first and second base station entities and removing the first and second communication interface instances, or disabling the communication interface between the first and third base station entities and removing the third and fourth communication interface instances;

wherein disabling the respective communication interface and removing the respective communication interface instances is based on an additional unconditional removal request transmitted by the removal initiating base station entity towards the respective removal responding base station entity.

4. The method according to claim 3, wherein a first interface benefit value and a second interface benefit value are computed by the first base station entity, the first interface benefit value being related to the importance—for the first base station entity—of the communication interface between the first base station entity and the second base station entity and the second interface benefit value being related to the importance—for the first base station entity—of the communication interface between the first base station entity and the third base station entity, and wherein, in the sixth step, the decision between removing the first and second communication interface instances or the third and fourth communication interface instances, or vice versa, also depends—besides the benefit information and the further benefit information—on the first interface benefit value and the second interface benefit value.

5. The method according to claim 4, wherein the benefit information and the further benefit information, and also the first interface benefit value and the second interface benefit value, relate to respective normalized benefit values.

6. The method according to claim 4, wherein the benefit value and the further benefit value, and also the first interface benefit value and the second interface benefit value, are computed taking into consideration one or more indicators, the one or more indicators comprising:
the number of handover procedures handled per predetermined time interval using the respective communication interface,
the availability and/or actual usage of functional features at the respective base station entities involved,
one or more indicators related to the load information, and/or
one or more indicators related to interference parameters.

7. The method according to claim 3, wherein the removal of the first and second communication interface instances or of the third and fourth communication interface instances and correspondingly disabling of the communication interface between the first and second base station entities or between the first and third base station entities is performed in a coordinated manner.

8. The method according to claim 4, wherein additional base station entities of the further base station entities transmit additional benefit information pieces to the first base station entity, and, correspondingly, additional interface benefit values are generated by the first base station entity.

9. The method according to claim 2, wherein the first removal message and/or the third removal message is
a conditional removal request to the respective removal responding base station entity, or
an inquiry message for obtaining the benefit information or the further benefit information.

10. A mobile communication network for communication between network nodes of the mobile communication network, wherein the mobile communication network comprises:
an access network; and
a core network;
wherein the access network comprises a plurality of base station entities, the plurality of base station entities comprising a first base station entity, a second base station entity, and further base station entities, wherein base station entities of the plurality of base station entities are configured to communicate directly with each other using respective communication interfaces between two base station entities of the plurality of base station entities;
wherein a communication interface is established between the first and second base station entities, the communication interface including a first communication interface instance at the first base station entity and a second communication interface instance at the second base station entity;
wherein the first base station entity is configured to transmit a first removal message from the first base station entity to the second base station entity such that the first base station entity acts as a removal initiating base station entity among the first and second base station entities and the second base station entity acts as a removal responding base station entity among the first and second base station entities; and
wherein the second base station entity is configured to transmit a second removal message from the second base station entity to the first base station entity, wherein the second removal message comprises a benefit information, wherein the benefit information is indicative of a benefit value—for the second base station entity—of the communication interface between the first and second base station entities.

11. The mobile communication network according to claim 10, wherein the further base station entities comprise a third base station entity, wherein a communication interface is established between the first and third base station entities including a third communication interface instance at the first base station entity and a fourth communication interface instance at the third base station entity;
wherein the first base station entity is further configured to transmit a third removal message from the first base station entity to the third base station entity such that the first base station entity acts as a removal initiating base station entity among the first and third base station entities and the third base station entity acts as a removal responding base station entity among the first and third base station entities; and
wherein the third base station entity is configured to transmit a fourth removal message from the third base station entity to the first base station entity, wherein the fourth removal message comprises a further benefit information, wherein the further benefit information is indicative of a benefit value—for the third base station entity—of the communication interface between the first and third base station entities.

12. The mobile communication network according to claim 11, wherein the mobile communication network is configured, depending on the benefit information, received from the second base station entity, and depending on the further benefit information, received from the third base station entity, for either disabling the communication interface between the first and second base station entities and removing the first and second communication interface instances, or disabling the communication interface between the first and third base station entities and removing the third and fourth communication interface instances,
wherein disabling the respective communication interface and removing the respective communication interface instances is based on an additional unconditional removal request transmitted by the removal initiating base station entity towards the respective removal responding base station entity.

13. One or more non-transitory computer-readable mediums having processor-executable instructions stored thereon for communication between network nodes of a mobile communication network, wherein the mobile communication network comprises an access network and a core network, wherein the access network comprises a plurality of base station entities, the plurality of base station entities comprising a first base station entity, a second base station entity, and further base station entities, wherein base station entities of the plurality of base station entities are enabled to be able to communicate directly with each other using respective communication interfaces between two base station entities of the plurality of base station entities, wherein the processor-executable instructions, when executed, facilitate performance of the following:
in a first step, establishing a communication interface between the first and second base station entities, wherein establishing the communication interface includes generating a first communication interface instance at the first base station entity and a second communication interface instance at the second base station entity;
in a second step, subsequent to the first step, transmitting a first removal message from the first base station entity—acting as a removal initiating base station entity among the first and second base station entities—to the second base station entity—acting as a removal responding base station entity among the first and second base station entities; and in a third step, subsequent to the second step, transmitting a second removal message from the second base station entity to the first base station entity, wherein the second removal message comprises a benefit information, wherein the benefit information is indicative of a benefit value—for the second base station entity—of the communication interface between the first and second base station entities.

\* \* \* \* \*